US009211934B2

United States Patent
Eguchi

(10) Patent No.: US 9,211,934 B2
(45) Date of Patent: Dec. 15, 2015

(54) ELECTRIC VEHICLE

(71) Applicant: SUZUKI MOTOR CORPORATION, Shizuoka-Ken (JP)

(72) Inventor: Teppei Eguchi, Shizuoka-Ken (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 14/478,938

(22) Filed: Sep. 5, 2014

(65) Prior Publication Data

US 2015/0075889 A1    Mar. 19, 2015

(30) Foreign Application Priority Data

Sep. 17, 2013 (JP) ................. 2013-192056

(51) Int. Cl.

| B62D 61/02 | (2006.01) |
| B62K 25/28 | (2006.01) |
| B62K 11/04 | (2006.01) |
| B62M 7/06 | (2006.01) |
| B62M 6/60 | (2010.01) |
| B62M 6/45 | (2010.01) |
| B62M 7/12 | (2006.01) |

(52) U.S. Cl.
CPC ............ *B62K 25/283* (2013.01); *B62K 11/04* (2013.01); *B62K 2204/00* (2013.01); *B62K 2208/00* (2013.01); *B62M 6/45* (2013.01); *B62M 6/60* (2013.01); *B62M 7/06* (2013.01); *B62M 7/12* (2013.01)

(58) Field of Classification Search
CPC ............ B62M 7/06; B62M 7/12; B62M 6/45; B62M 6/60; B62K 2202/00; B62K 2204/00; B62K 5/025; B62K 5/06; B62D 1/08; B60K 1/00
USPC .......................................................... 180/220
See application file for complete search history.

(56) References Cited

U.S. PATENT DOCUMENTS

| 2010/0018787 A1* | 1/2010 | Plazotta et al. ............... 180/65.6 |
| 2011/0036657 A1* | 2/2011 | Bland et al. .................. 180/220 |
| 2013/0032424 A1* | 2/2013 | Sand ............................ 180/220 |

FOREIGN PATENT DOCUMENTS

JP            2013154859          8/2013

* cited by examiner

*Primary Examiner* — Kevin Hurley
*Assistant Examiner* — Marlon Arce
(74) *Attorney, Agent, or Firm* — Barnes & Thornburg LLP

(57) ABSTRACT

An electric vehicle, such as an electric motorcycle, which includes a vehicle body; a vehicle body frame having a head pipe that holds a front wheel in a steerable manner; a swing arm holding a rear wheel in a swingable manner in a vertical direction of the vehicle body; an electric motor arranged to a substantially central portion between the front wheel and the rear wheel; a battery arranged in a space between the head pipe and the electric motor and inside the vehicle body frame in a manner deviated to either one of sides in a width direction of the vehicle body; and a rear suspension tilted forward and arranged inside the vehicle body frame and above the electric motor in a manner deviated to another one of the sides in the width direction of the vehicle body.

5 Claims, 9 Drawing Sheets

ELECTRIC VEHICLE

PRIORITY CLAIM

This patent application claims priority to Japanese Patent Application No. 2013-192056, filed 17 Sep. 2013, the disclosure of which is incorporated herein by reference in its entirety.

BACKGROUND OF THE INVENTION

1. Field of the Invention

The present invention relates to an electric vehicle.

2. Related Art

There is known an electric vehicle in which a suspension of a rear wheel is arranged in a central section of a vehicle so that the suspension and a battery are overlapped in side view of the vehicle (for example, refer to Patent Document 1: Japanese Patent Laid-Open Publication No. 2013-154859).

In an electric vehicle, maximum power and traveling range depend on a battery capacity, and in order to increase the maximum power and extend the traveling range, it is hence required to mount many batteries in a small-sized and light-weight vehicle body.

In a case where an electric motorcycle is considered as a specific example of an electric vehicle, a part of a vehicle body is interposed between insides of thighs of a rider. Thus, in designing of the vehicle, since the vehicle should be prevented from interfering with a riding position of the rider, strict restrictions are placed on sizes of a battery volume in either of width and vertical directions. Even if the battery volume is enlarged in a longitudinal direction of the vehicle, such enlargement results in increase in a wheel base and hence, increase in size and weight of the vehicle.

On the other hand, the cost and weight of the electric vehicle can be reduced by employing a structure in which a suspension is arranged so as to be extendable in the longitudinal direction of the vehicle thereby eliminating a link mechanism for interlocking the suspension and a swing arm. This structure can also improve riding comfort by adding progressive characteristics to the suspension.

SUMMARY OF THE INVENTION

The present invention was conceived in consideration of the circumstances mentioned above and an object thereof is to provide an electric vehicle capable of reducing size and weight thereof and capable of adding progressive characteristics to a suspension by suitably arranging a battery and the suspension.

The above and other objects can be achieved according to the present invention by providing an electric vehicle including: a vehicle body; a vehicle body frame having a head pipe that holds a front wheel in a steerable manner; a swing arm holding a rear wheel in a swingable manner in a vertical direction of the vehicle body; an electric motor arranged to a substantially central portion between the front wheel and the rear wheel; a battery arranged in a space between the head pipe and the electric motor and inside the vehicle body frame in a manner deviated to either one of sides in a width direction of the vehicle body; and a rear suspension tilted forward and arranged inside the vehicle body frame and above the electric motor in a manner deviated another one of the sides in the width direction of the vehicle body, the rear suspension suspending the swing arm on the vehicle body frame and being overlapped with the battery in a side view of the vehicle.

In a preferred embodiment, it may be desired that the rear suspension is surrounded by the electric motor, the battery and electric components arranged above the rear suspension.

It may be also desired that the vehicle body frame is a joined member of a pair of half bodies divided in two parts in the width direction of the vehicle body, the electric motor is fixed to either one of the half bodies, and an axis of swing motion of the swing arm is arranged within a projection of the electric motor in a side view of the vehicle body and closer to an output shaft of the electric motor than to an edge of the projection.

It may be further desired that the rear suspension extends toward a front side of the vehicle body obliquely upward from a portion above a substantially central portion of the swing arm and above a straight line connecting the axis of swing motion of the swing arm and a rotation axis of the rear wheel.

The electric vehicle may be an electric motorcycle.

According to the electric vehicle of present invention having the structures and characters mentioned above, the size and weight thereof can be reduced and progressive characteristics can be applied to a suspension by suitably arranging a battery and the suspension.

The other and further futures and advantageous effects of the present invention will be made clearer from the following description made with reference to the accompanying drawings.

DESCRIPTION OF THE PREFERRED EMBODIMENT

Hereinafter, an electric motorcycle as one embodiment of the electric vehicle of the present invention will be described with reference to FIGS. 1 to 9. It is further to be noted that terms of "upper", "lower", "right", "left", "front", "rear" and the like terms indication directions are used herein with reference to the illustration of the drawings or in a state of the electric vehicle on which a rider sits.

Figure 1:
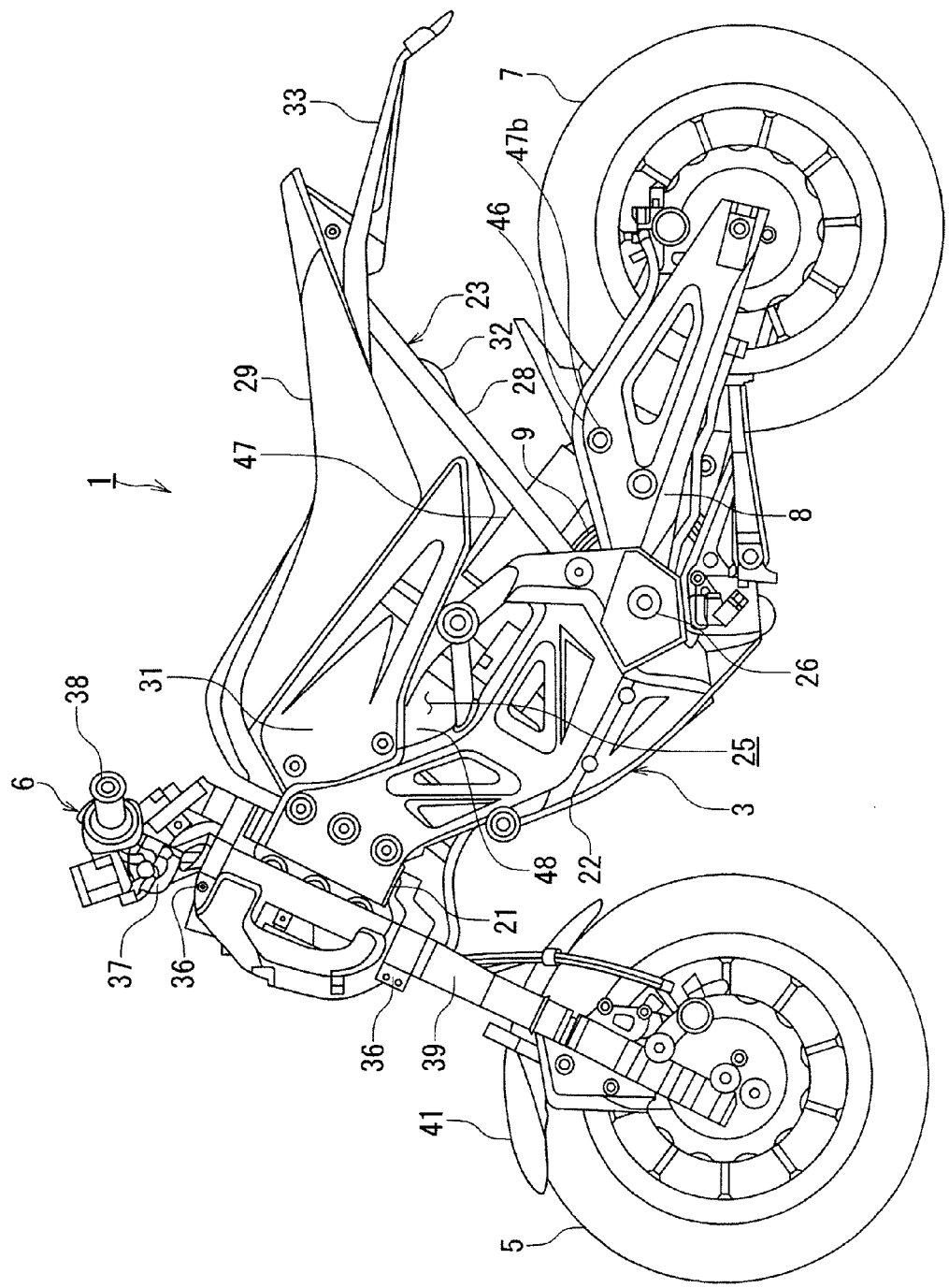
FIG. 1 is a left side view of an electric motorcycle as an electric vehicle in accordance with an embodiment of the present invention.
Figure 2:
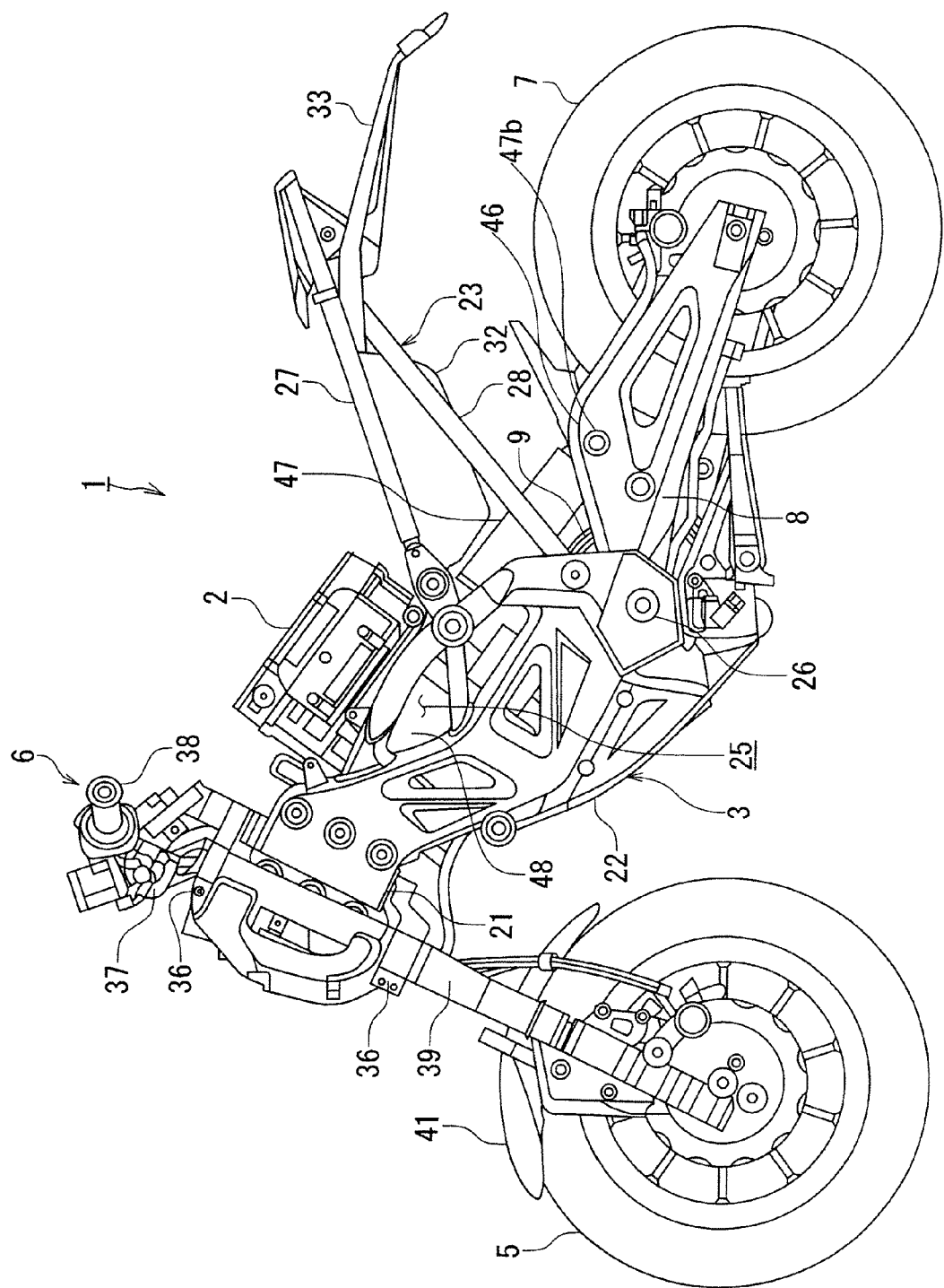
FIG. 2 is also a left side view of the electric vehicle of FIG. 1 from which a seat and a side cover are removed.
Figure 3:
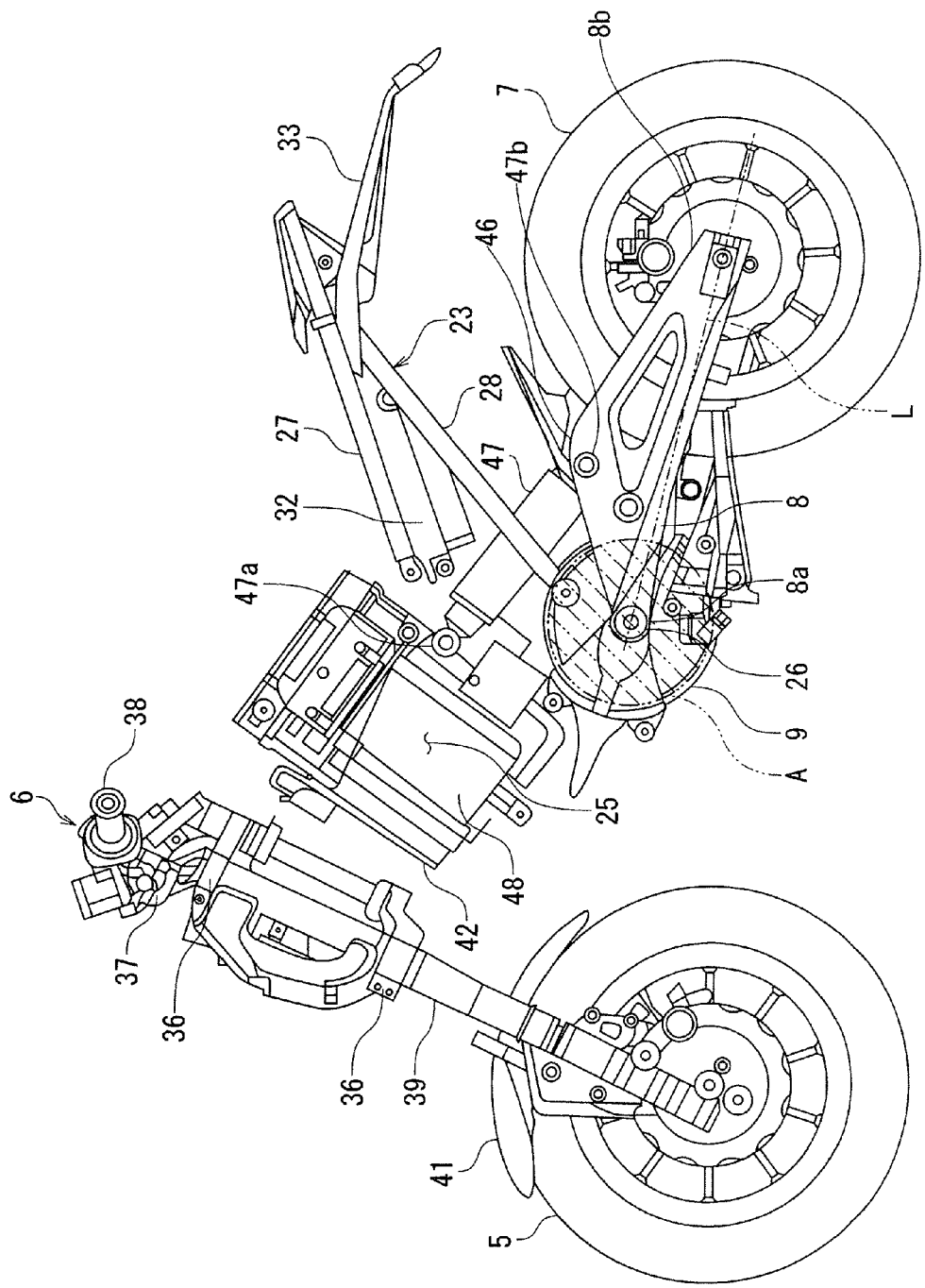
FIG. 3 is also a left side view of the electric vehicle of FIG. 1, from which the seat, the side cover and a lower cover are removed.
Figure 4:
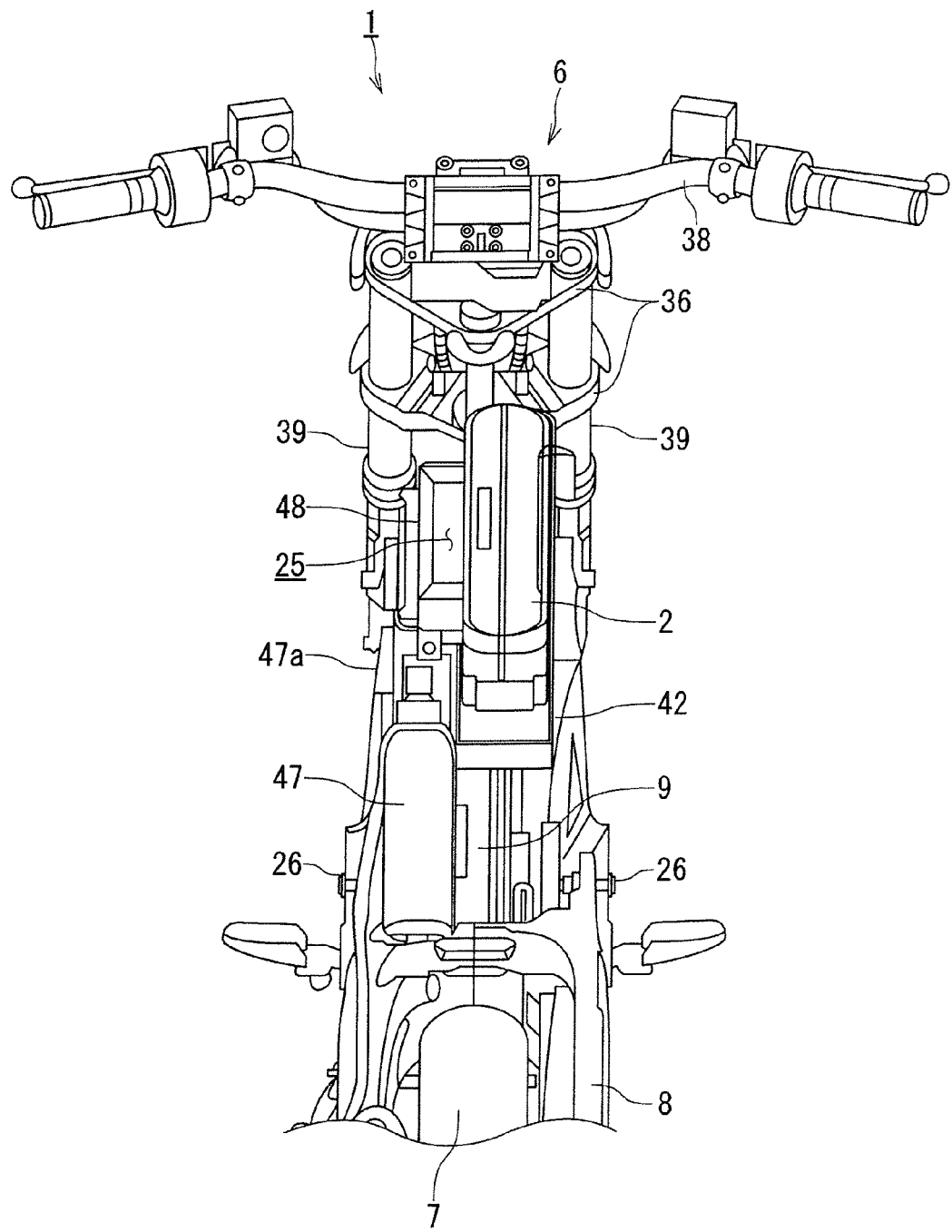
FIG. 4 shows the electric vehicle viewed from an upper back portion of the electric vehicle shown in FIG. 3.
Figure 5:
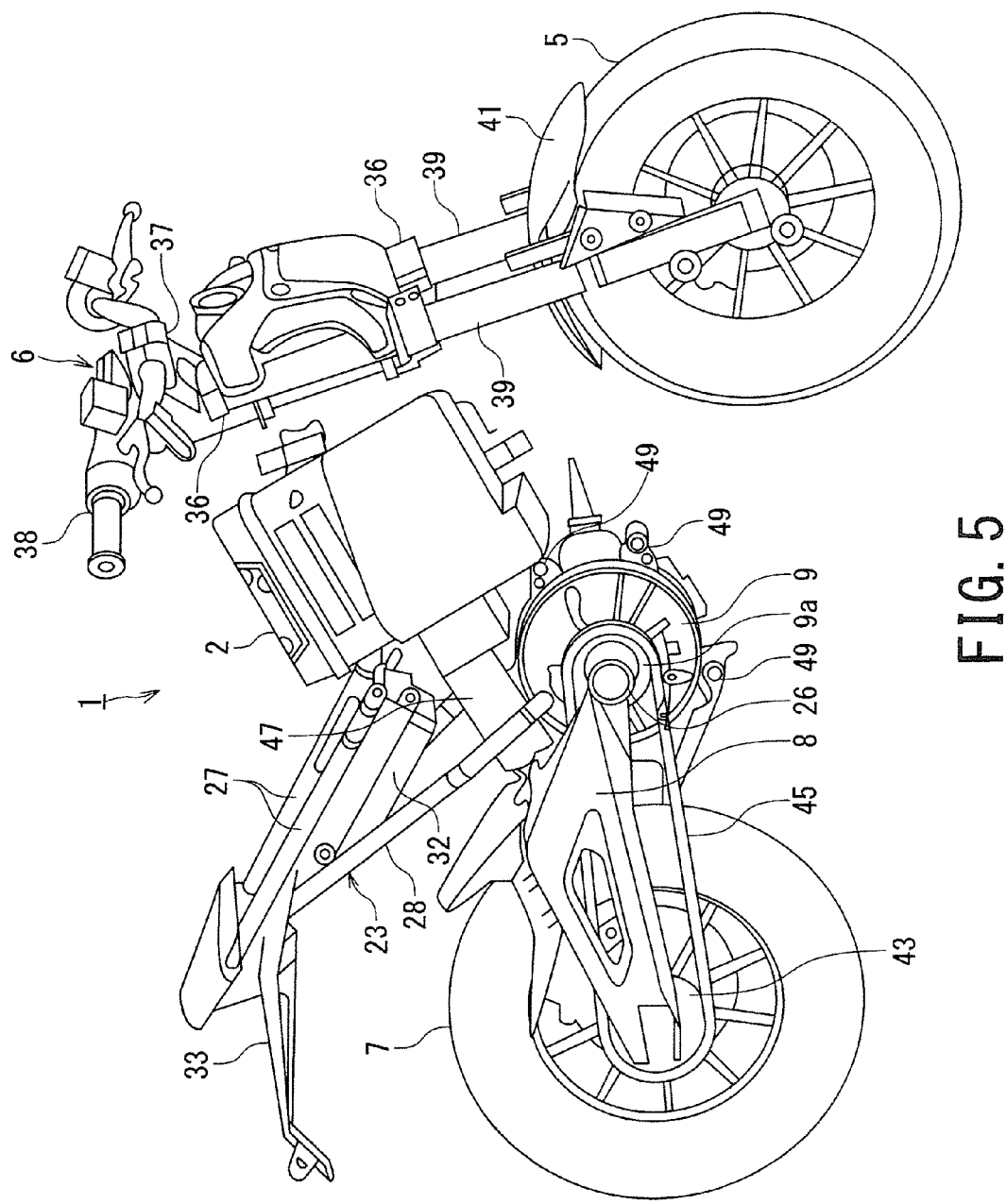
FIG. 5 is a perspective view showing a right side of the electric vehicle shown in FIG. 3.

With reference to FIGS. 1 to 3, an electric motorcycle 1, as an electric vehicle of the present invention, in which a rider (driver) sits on a vehicle body seat in a straddle manner. The electric motorcycle 1 is a type so-called a dual purpose vehicle in consideration of traveling on an unpaved road and an uneven ground (off-road) in addition to traveling on a paved road and a public road. The electric motorcycle 1 travels by using electric power of a battery 2.

The electric motorcycle 1, as a vehicle, includes: a vehicle body frame 3 extending in a longitudinal direction of the vehicle body of the electric motorcycle (hereinafter referred to as "vehicle"); a front wheel 5 arranged on a front side of the vehicle body frame 3; a steering mechanism 6 provided at a front end of the vehicle body frame 3 to support the front wheel 5 to be rotatable; a rear wheel 7 arranged on a rear side of the vehicle body frame 3; a swing arm 8 provided to the vehicle body frame 3 to support the rear wheel 7 to be rotatable; the battery 2 mounted in the vehicle body frame 3; and an electric motor 9 mounted in the vehicle body frame 3.

The vehicle body frame 3 includes: a head pipe 21 arranged at a front end of the vehicle body frame 3; a main frame 22 extending from the head pipe 21 to a central portion of the vehicle body; and a rear frame 23 extending from a rear end of the main frame 22 to a rear end of the vehicle body.

The head pipe 21 supports the steering mechanism 6 in a turnable manner in a lateral direction of the vehicle and also supports the front wheel 5 in a steerable manner.

The main frame 22 extends backward obliquely downward from a rear portion of the head pipe 21 to a central portion of the vehicle. The main frame 22 branches from side to side to define a space 25 for mounting equipments or parts in the central portion. In this space 25, the battery 2 and the electric motor 9 are accommodated.

The main frame 22 is provided with a pivot shaft 26 supporting the swing arm to be swingable.

The rear frames 23 are disposed above the pivot shaft 26 so as to extend backward obliquely upward from right and left rear portions of the main frame 22. The rear frames 23 include a pair of left and right seat rails 27, and a pair of left and right side frames 28 supporting the seat rails 27 from the lower sides thereof. Front ends of the seat rails 27 and the side frames 28 branch up and down to be joined to the main frame 22, and on the other hand, rear ends of the seat rails 27 and the side frames 28 are merged in a rear end of the vehicle body frame 3.

A seat 29 is disposed above the right and left seat rails 27 to allow a driver to be seated thereon, and is supported by the rear frames 23. The seat 29 is provided, on its right and left sides below a front portion thereof, with a pair of left and right side covers 31. The right and left side covers 31 are provided so as to cover an exterior of the main frame 22 and the seat 29 to enhance an outer appearance.

In addition, an electric component such as a controller 32 is provided inside the rear frame 23 for controlling the driving of the electric motor 9, and the controller 32 is provided on the right and left seat rails 27 so as to be arranged in a space defined by the right and left side frames 28.

A rear fender 33 is provided at a rear end portion of the rear frame 23 so as to cover an upper portion of the rear wheel 7.

The steering mechanism 6 is supported by the head pipe 21 of the vehicle body frame 3 in a steerable manner in a lateral direction of the electric motorcycle 1.

The steering mechanism 6 includes: a steering bracket 36 supported by the head pipe 21 in a rotatable manner; a handle bar clamp 37 provided in a upper portion of the steering bracket 36; a handle 38 fixed to the steering bracket 36 with the handle bar clamp 37; a pair of left and right front suspensions 39 fixed to the steering bracket 36; and a front fender 41 that is provided in right and left front suspensions 39, with which a portion above the front wheel 5 is covered.

The steering mechanism 6 changes a direction of the front wheel 5 together with the front suspension 39 by steering the handle 38 in the lateral direction.

The handle bar clamp 37 joins the handle 38 to the steering bracket 36 so that the handle 38 integrally turns with the steering bracket 36.

The handle 38 is fixed to the handle bar clamp 37 at the central portion in the width direction of the vehicle body so as to extend from a portion fixed by the handle bar clamp 37 in the lateral direction and backward obliquely upward and then extend in the lateral direction in a bent manner.

The front suspension 39 extends in the vertical direction of the vehicle body so that an upper end thereof is fixed to the steering bracket 36 and a lower end thereof supports the front wheel 5 in a rotatable manner. The front suspension 39 absorbs a shock between the vehicle body frame 3 and the front wheel 5 by being expanded and contracted.

The battery 2 is a secondary battery such as a lithium ion battery and stores electric power to be supplied to electric components, such as the controller 32 and an inverter, not shown, and the electric motor 9. The battery 2 is arranged in a space between the head pipe 21 and the electric motor 9 and inside the vehicle body frame 3 in a manner deviated to either one side in the in width direction of the vehicle body. In the present embodiment, although the battery 2 is deviated to the right side of the vehicle body, the battery 2 may be deviated to the left side thereof.

A battery box 42 is provided on a right side half body 22a of the main frame 22 and fixed thereto by means of bolts, not shown, so as to detachably hold the battery 2.

The electric motor 9 is arranged at a substantially central portion between the front wheel 5 and the rear wheel 7 and is accommodated inside the vehicle body frame 3, more particularly, to the lower end portion of the main frame 22. The electric motor 9 is driven by electric power supplied from the battery 2 through the inverter and is controlled by the controller 32. The rear wheel 7 is provided with a driven sprocket 43, and a chain or belt 45 is stretched between the electric motor 9 and the driven sprocket 43. The chain or belt 45 transfers power of the electric motor 9 to the rear wheel 7.

The swing arm 8 supports the rear wheel 7 in a swingable manner in the vertical direction. More specifically, the swing arm 8 includes a front end 8a supported by the pivot 26 of the vehicle body frame 3, and a rear end 8b supporting the rear wheel 7 in a rotatable manner.

The swing arm 8 is provided in its central portion with a suspension rear end supporting portion 46 that expands upward with respect to a line L connecting an axis of swing motion of the pivot 26 and a rotation center of the rear wheel 7. The suspension rear end supporting portion 46 is protruded most upward in the swing arm 8.

The axis of the swing motion of the swing arm 8 or the pivot 26 is arranged within a projection (i.e., region) A shown in FIG. 3 of the electric motor 9 in the side view of the vehicle so as to be closer to an output shaft 9a of the electric motor 9 than to an edge of the projection A. The pivot 26 and the output shaft 9a of the electric motor 9 may be arranged in the same line.

A rear suspension 47 in a forward tilting posture is provided between the main frame 22 and the swing arm 8. The rear suspension 47 is arranged inside the vehicle body frame 3 and above the electric motor 9 to suspend the swing arm 8 with respect to the vehicle body frame 3.

Furthermore, the rear suspension 47 is deviated to a side opposite to the battery 2 in a width direction of the vehicle, i.e. either one side different from the battery 2 in the width direction of the vehicle. In the present embodiment, although the rear suspension 47 is deviated to the left side of the vehicle, the rear suspension 47 may be deviated to the right side of the vehicle in an arrangement in which the battery 2 is deviated to the left side of the vehicle.

The rear suspension 47 overlaps with the battery 2 in the side view of the vehicle, and specifically, a front end 47a of the rear suspension 47 overlaps with the battery 2 in the side view of the vehicle.

Moreover, the rear suspension 47 is provided at a portion above the substantially central portion of the swing arm 8 and above the straight line L connecting rotation axes of the pivot 26 and the rear wheel 7, that is, in a manner of extending toward the front side of the vehicle obliquely upward from the suspension rear end supporting portion 46 of the swing arm 8. That is, more specifically, the rear end 47b of the rear suspension 47 is supported by the suspension rear end supporting portion 46 of the swing arm 8, and the front end 47a of the rear suspension 47 extends to the left side of the battery 2.

The rear suspension 47 is surrounded by the electric motor 9, the battery 2, and the controller 32 arranged above the rear suspension 47. More specifically, the rear suspension 47 is surrounded by the electric motor 9 arranged below the rear suspension 47, the battery 2 arranged on the right side of the rear suspension 47, and the controller 32 arranged above the rear suspension 47.

The rear suspension 47 is arranged in an inclined manner near the top surface of the electric motor 9 so as to secure a sufficient space below the rear frame 23 capable of arranging the controller 32 therein.

The rear suspension 47 in a forward tilting posture lies in a longitudinal direction of the vehicle. Thus, as compared with a case where the rear suspension 47 is mounted to stand in a vertical direction of the vehicle, a lever ratio change in accordance with the swing motion of the swing arm 8 increases even if a link mechanism is not provided, so that progressive characteristics are added.

In the component mountable space 25 of the main frame 22, which is positioned on the left side of the battery 2 and the front side of the rear suspension 47, a housing box 48 capable of storing a variety of fixtures, for example, a charger, not shown, for quickly charging the battery 2, is arranged.

Figure 6:
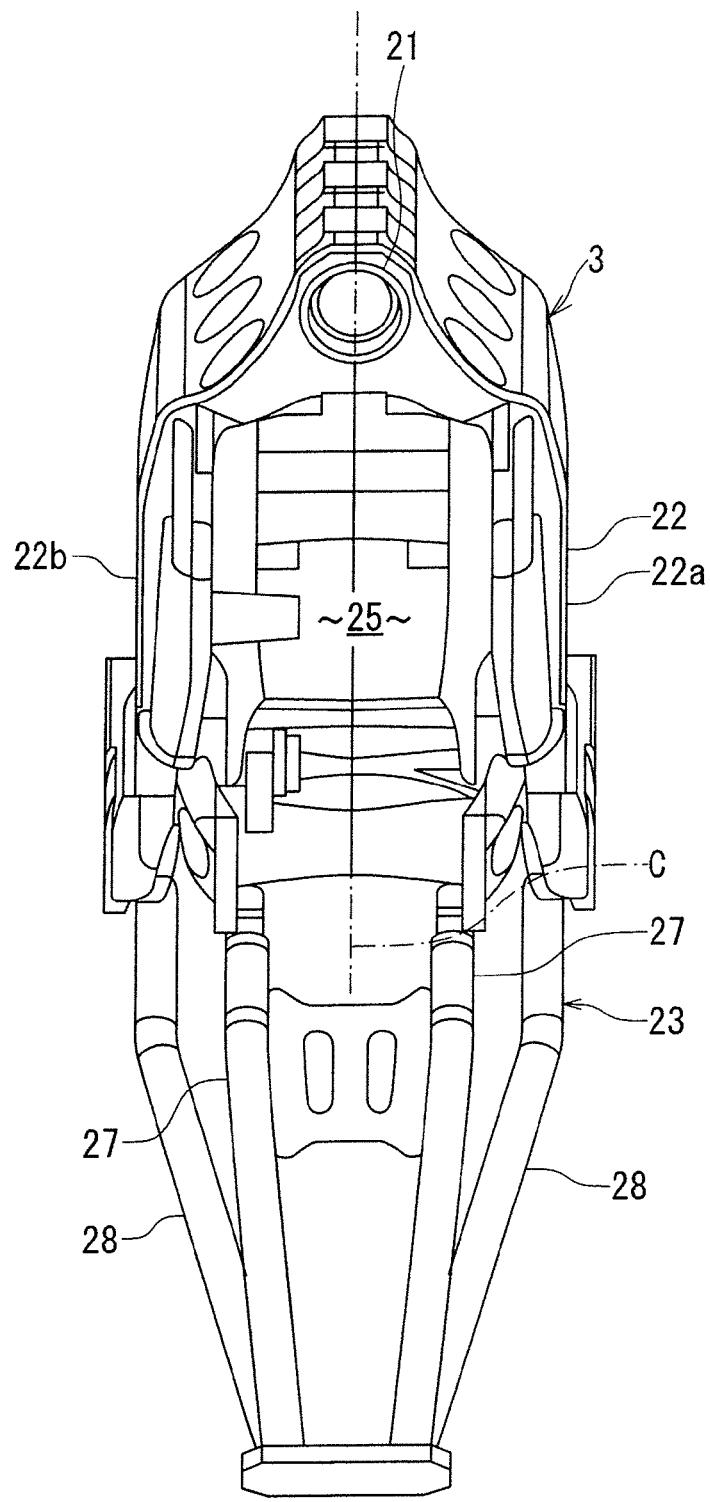
FIG. 6 is a plan view showing a vehicle body frame of the electric vehicle shown in FIG. 1 in accordance with the embodiment of the present invention.
Figure 7:
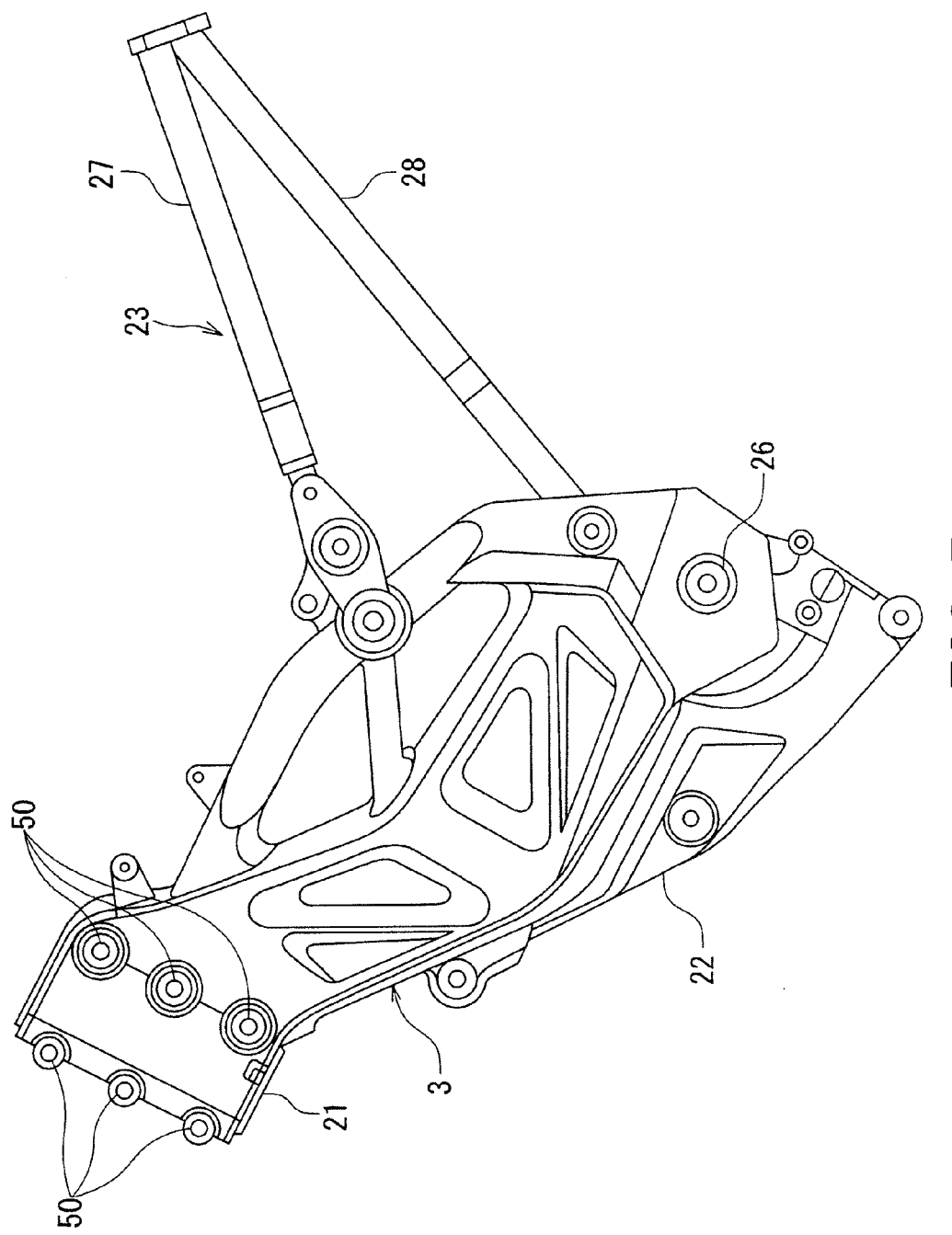
FIG. 7 is a left side view showing the vehicle body frame of the electric vehicle shown in FIG. 1.
Figure 8:
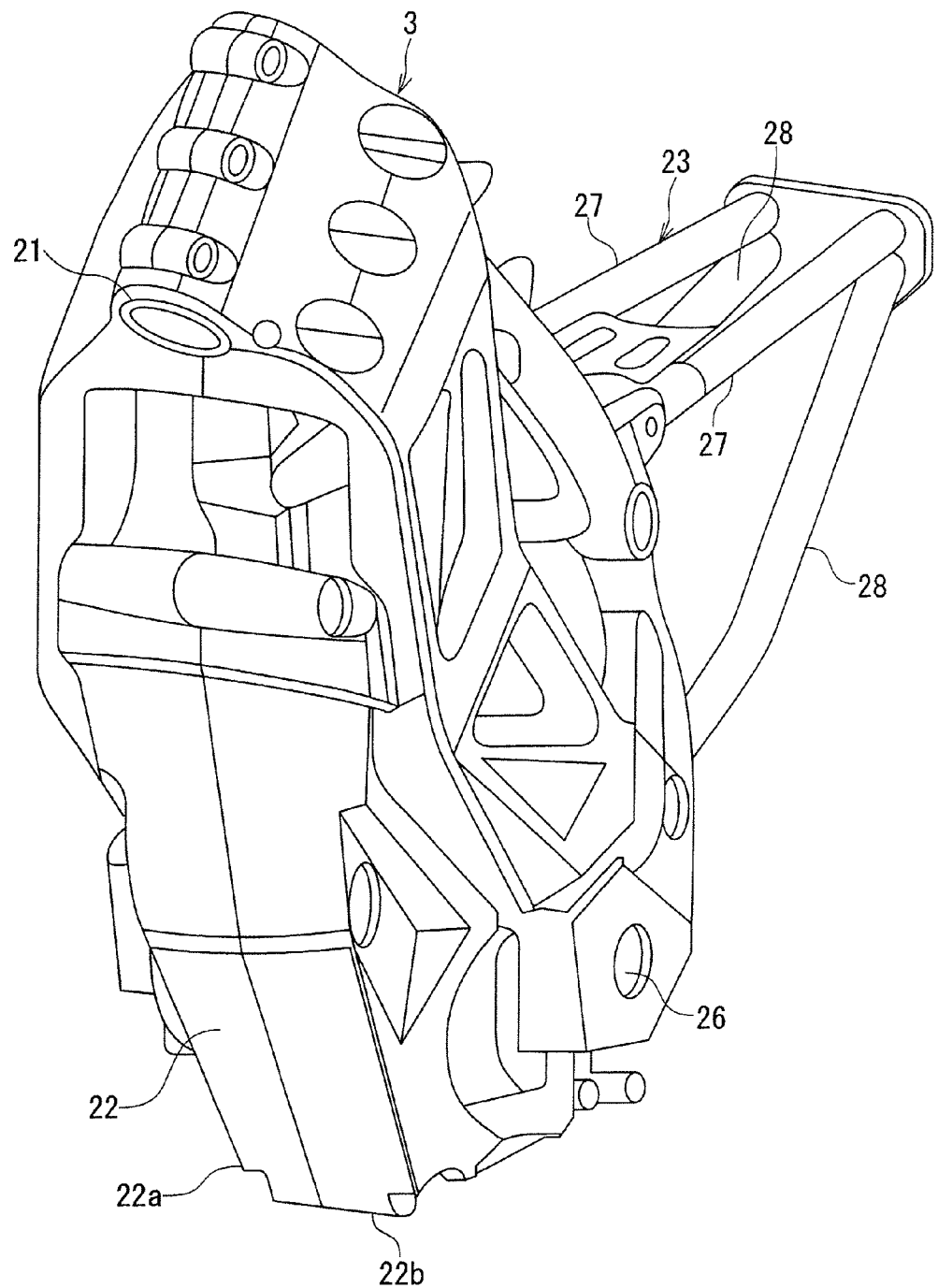
FIG. 8 is a perspective view showing a left side of the electric vehicle viewed from a front side thereof shown in FIG. 1.

FIGS. 6 to 8 shoe the vehicle body frame 3, and as shown in these figures, the vehicle body frame 3 of the electric motorcycle 1 in accordance with the present embodiment is formed by integrating the head pipe 21, the main frame 22, and the rear frame 23.

The head pipe 21 in the vehicle body frame 3 is a cylindrical integral pipe formed by being molded. The main frame 22 is a joined member of a pair of half bodies 22a and 22b divided in the width direction of the vehicle into right and left halves with respect to the center line C extending in the longitudinal direction of the vehicle. The head pipe 21 is sandwiched by a pair of the half bodies 22a and 22b of the main frame 22 from the right and left sides and fixed to the main frame 22 by six bolts 50.

The main frame 22 is a structure occupying a large area of most of portions in the side view of the vehicle and defines the component mountable space 25 that separates a pair of the half bodies 22a and 22b.

In the main frame 22, while a section thereof from the front surface of the component mountable space 25 to the bottom surface thereof is closed, a section from the upper side of the component mountable space 25 to the rear side thereof is opened. The battery 2 stored in the component mountable space 25 can be taken out therefrom in the upward direction of the vehicle body by opening or removing a lid-like structure such as the seat 29 and a part of a vehicle body cover which are arranged above the battery 2.

The right and left seat rails 27 of the rear frame 23 are arranged closer to the central position of the vehicle body than the side surfaces of the main frame 22 in the width direction of the vehicle, and extend from the front ends thereof connected to the main frame 22 to the rear ends thereof nearly parallel to each other. On the other hand, the right and left side frames 28 are away from each other side to side by a distance almost the same as the width of the main frame 22, and are bent inward of the vehicle body at the middle portion thereof so as to be joined at the rear ends of the seat rails 27 while approaching each other.

Figure 9:
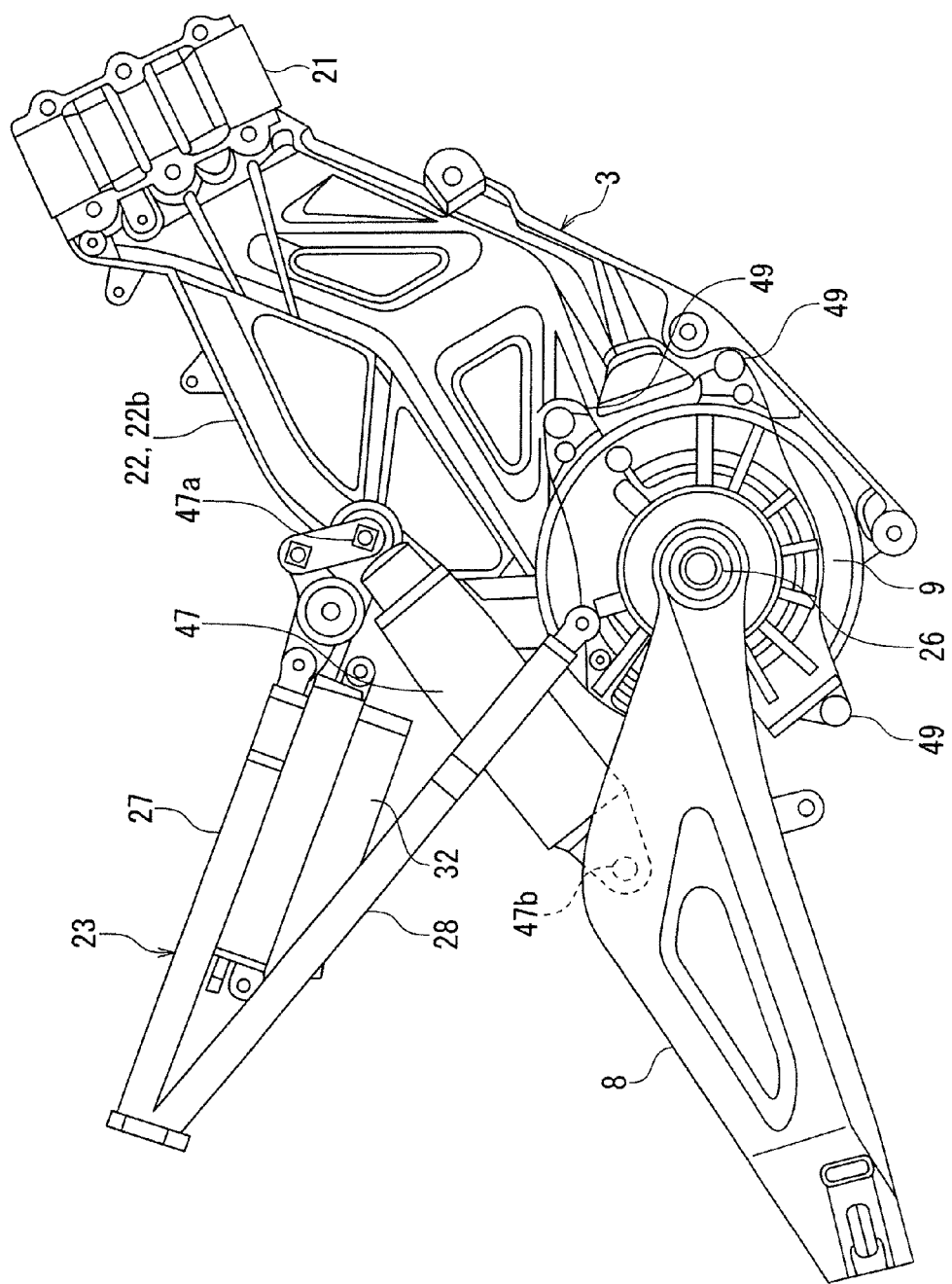
FIG. 9 is a right side view showing a half body of the vehicle body frame of the electric vehicle in accordance with the embodiment of the present invention.

FIG. 9 is a right side view showing a half body of the vehicle body frame of the electric vehicle, i.e. motorcycle, according to the embodiment of the present invention.

As shown in FIG. 9, the electric motor 9 of the electric motorcycle 1 of the present embodiment is fixed to the left side half body 22b of the main frame 22 by fastening the bolts 49 at a plurality of portions of the half body 22b. Further, the rear suspension 47 is also fixed to the left side half body 22b of the main frame 22.

In the electric motorcycle 1 of the present embodiment, the battery 2 and the rear suspension 47 are arranged inside the vehicle body frame 3 so as to be placed on different sides in the width direction of the vehicle in the deviated manner, and the battery 2 and the rear suspension 47 are overlapped with each other in the side view of the vehicle. Accordingly, the wheel base is shortened, thus contributing to reduction in size and weight of the vehicle and also contributing enlargement of capacity of the battery 2 by securing the space from the head pipe 21 to the electric motor 9 in the mounting place of the battery 2.

Furthermore, as mentioned above, since the battery 2 and the rear suspension 47 are arranged inside the vehicle body frame 3 on the different sides in the width direction of the vehicle in the deviated and overlapped manner in the side view of the vehicle, the progressive characteristics are added by inclining the rear suspension 47 forward without locating any link mechanism.

Still furthermore, according to the above arrangement of the battery 2 and the rear suspension 47, the weight balance in the width direction of the vehicle is equalized to thereby improve maneuverability, stability, and safety of the vehicle.

Still furthermore, according to the above arrangement of the battery 2 and the rear suspension 47, heavy components or parts are intensively arranged in the central portion of the vehicle, thus improving maneuverability, stability, and safety of the vehicle. Moreover, the overall width of the vehicle is reduced by preventing an overhang to an outside in the width direction, thus also contributing the reduction in the width length and size of the vehicle.

In addition, according to the electric motorcycle 1 of the present embodiment, since the rear suspension 47 is surrounded by the electric motor 9, the battery 2, and the controller 32, the wheel base is shortened, thereby contributing the reduction in size and weight of the vehicle. Furthermore, the heavy components or parts are intensively arranged in the central portion of the vehicle, thus improving the maneuverability, stability and safety of the vehicle.

Furthermore, in the electric motorcycle 1 according to the present embodiment, since the electric motor 9 is fixed to any one of the half bodies 22a and 22b of the main frame 22 and the axis of swing of the swing arm 8 is arranged near the output shaft 9a of the electric motor 9, the center of gravity of the vehicle is lowered, thus improving the maneuverability, stability and safety of the vehicle. In addition, the length of a chain or a belt does not change even if the rear wheel 7 swings, so that the load of the chain or belt can be reduced, thus contributing the extension of usable life of the chain or belt.

Still furthermore, according to the electric motorcycle 1 of the present embodiment, since the rear suspension 47 extends obliquely upward at an angle from the suspension rear end supporting portion 46 protruded upward from the swing arm 8 toward the front side of the vehicle, the progressive characteristics are added without providing a link mechanism, and it is possible to contribute to the reduction in the number of components, cost and weight as the link mechanism becomes unnecessary.

As mentioned above, according to the electric motorcycle 1 of the described embodiment of the present invention, favorable arrangement of the battery 2 and the rear suspension 47 achieves both the reduction in size and weight of the vehicle and the addition of progressive characteristics to the rear suspension 47.

It is further to be noted that the present invention is not limited to the described embodiment, and many other changes and modifications or alternations may be made without departing from the scope of the appended claims.

What is claimed is:

1. An electric vehicle comprising:
  a vehicle body;
  a vehicle body frame having a head pipe that holds a front wheel in a steerable manner;
  a swing arm holding a rear wheel in a swingable manner in a vertical direction of the vehicle body;
  an electric motor arranged to a substantially central portion between the front wheel and the rear wheel;
  a battery arranged in a space between the head pipe and the electric motor and inside the vehicle body frame in a manner deviated to either one of sides in a width direction of the vehicle body; and
  a rear suspension tilted forward and arranged inside the vehicle body frame and above the electric motor in a manner deviated another one of the sides in the width direction of the vehicle body opposing to the battery in the vehicle width direction, the rear suspension suspending the swing arm on the vehicle body frame and being overlapped with the battery in a side view of the vehicle, the rear suspension having a front end extending to one side of the battery in the vehicle width direction.

2. The electric vehicle according to claim 1, wherein the rear suspension is surrounded by the electric motor, the battery and electric components arranged above the rear suspension.

3. The electric vehicle according to claim 1, wherein the vehicle body frame is a joined member of a pair of half bodies divided into two parts in the width direction of the vehicle body, the electric motor is fixed to either one of the half bodies, and an axis of swing motion of the swing arm is arranged within a projection of the electric motor in a side view of the vehicle body and closer to an output shaft of the electric motor than to an edge of the projection.

4. The electric vehicle according to claim 1, wherein the rear suspension extends toward a front side of the vehicle body obliquely upward from a portion above a substantially central portion of the swing am and above a straight line connecting the axis of swing motion of the swing arm and a rotation axis of the rear wheel.

5. The electric vehicle according to claim 1, wherein the electric vehicle is an electric motorcycle.

* * * * *